July 8, 1958 K. CLARK 2,841,887
GUN TRAINING MECHANISM
Original Filed May 9, 1945 6 Sheets-Sheet 1

INVENTOR.
Kendall Clark
BY
His Attorneys

INVENTOR.
Kendall Clark

July 8, 1958 — K. CLARK — 2,841,887
GUN TRAINING MECHANISM
Original Filed May 9, 1945 — 6 Sheets-Sheet 3

INVENTOR.
Kendall Clark
BY
His Attorneys

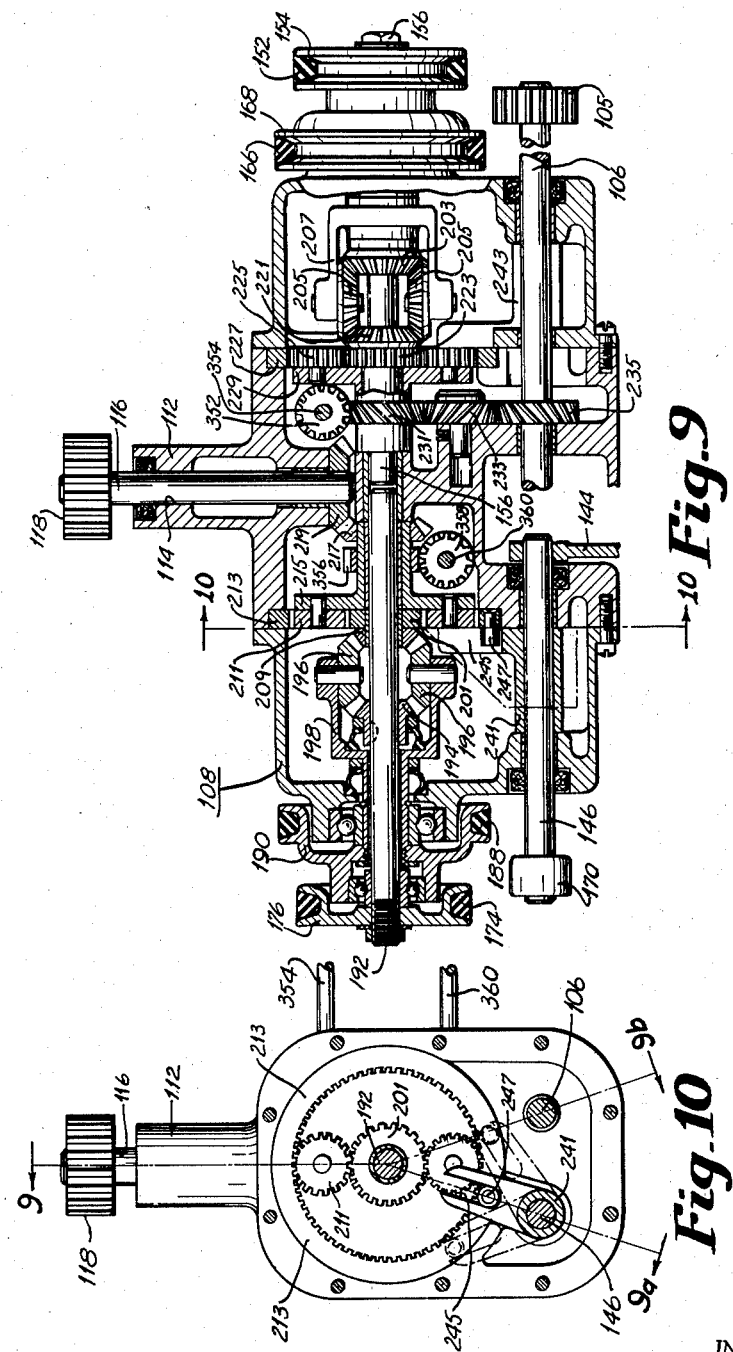

July 8, 1958     K. CLARK     2,841,887
GUN TRAINING MECHANISM
Original Filed May 9, 1945     6 Sheets-Sheet 5
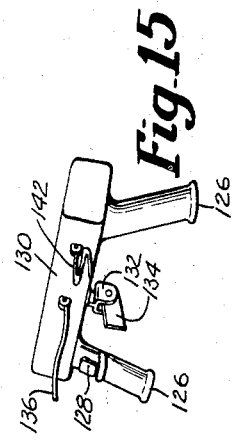
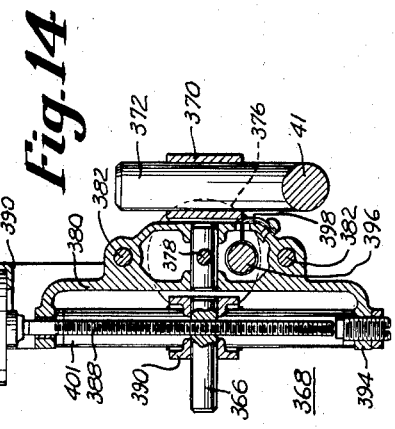
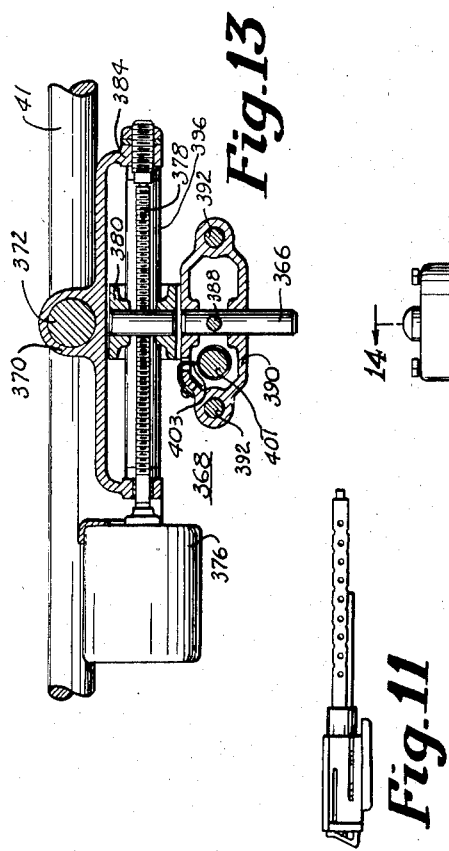
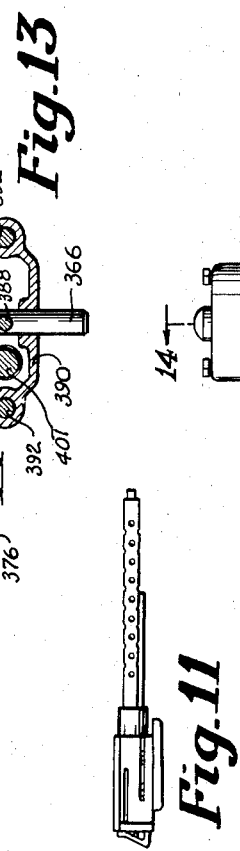
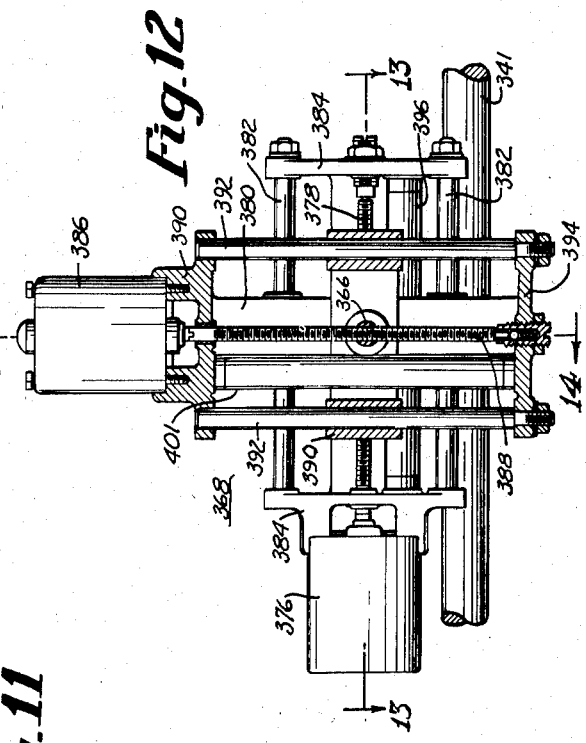
INVENTOR.
Kendall Clark
BY July 8, 1958 K. CLARK 2,841,887
GUN TRAINING MECHANISM
Original Filed May 9, 1945 6 Sheets-Sheet 6

INVENTOR.
Kendall Clark

United States Patent Office 2,841,887
Patented July 8, 1958

2,841,887

GUN TRAINING MECHANISM

Kendall Clark, Glen Ellyn, Ill.

Original application May 9, 1945, Serial No. 592,765, now Patent No. 2,640,395, dated June 2, 1953. Divided and this application May 29, 1953, Serial No. 358,386

3 Claims. (Cl. 35—25)

This invention relates to gun turrets and includes a method of and apparatus for training gunners.

This application is a division of my copending application Serial No. 592,765, filed May 9, 1945 for Gun Training Mechanism, now Patent No. 2,640,395, issued June 2, 1953.

It is an object of my invention to provide a training turret having a compensating gun sight and a moving target together with a means for simulating the firing of the gun and recording the number of simulated shots fired as well as the number of simulated shots which would have hit the target.

It is another object of my invention to provide an improved and more responsive mechanism for controlling the movement of a gun which will reduce hunting and which is applicable both to guns for training purposes and to guns used in actual combat.

These objects are attained by providing a turret similar to the turret used for actual combat having compensating gun sight and gun simulating means with a firing control together with a movable target which may be automatically or manually controlled and provided with a compensating means in order to compute the proper direction of the gun upon the target. An improved form of continuously operating drive means to control the movement of the gun in vertical and horizontal directions is provided with an initially effective manually operated accelerating device to reduce hunting.

Further objects and advantages of the present invention will be apparent from the following description, reference being had to the accompanying drawings wherein a preferred form of the present invention is clearly shown.

In the drawings:

Figure 9 is a horizontal sectional view of the drive unit shown in Figure 4 taken along 9—9a—9b of Figure 10;

Figure 10 is a sectional view taken along the lines 10—10 of Figure 9;

Figure 11 is a view of a machine gun which may be used in pairs upon the turret shown in Figure 1 when used in actual combat.

Figure 12 is a front view of the compensating means for compensating for the speed of movement of a target in order to accurately score the gunner;

Figure 13 is a sectional view taken along the line 13—13 of Figure 12;

Figure 14 is a sectional view taken along the lines 14—14 of Figure 12;

Figure 15 is a rear view of the gun moving and firing control; and

Figure 1:
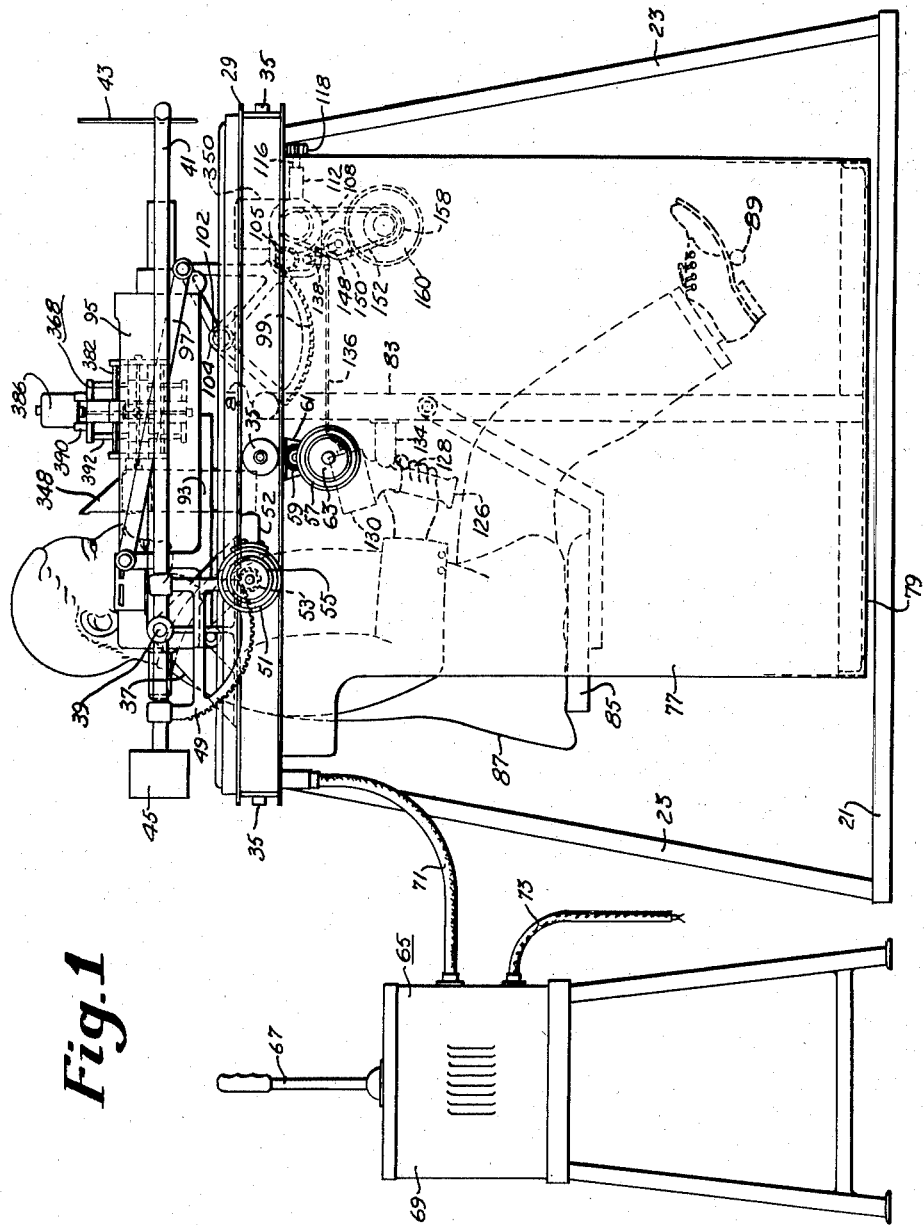
Figure 1 is a view in elevation of a training turret and target control embodying one form of my invention.
Figure 2:
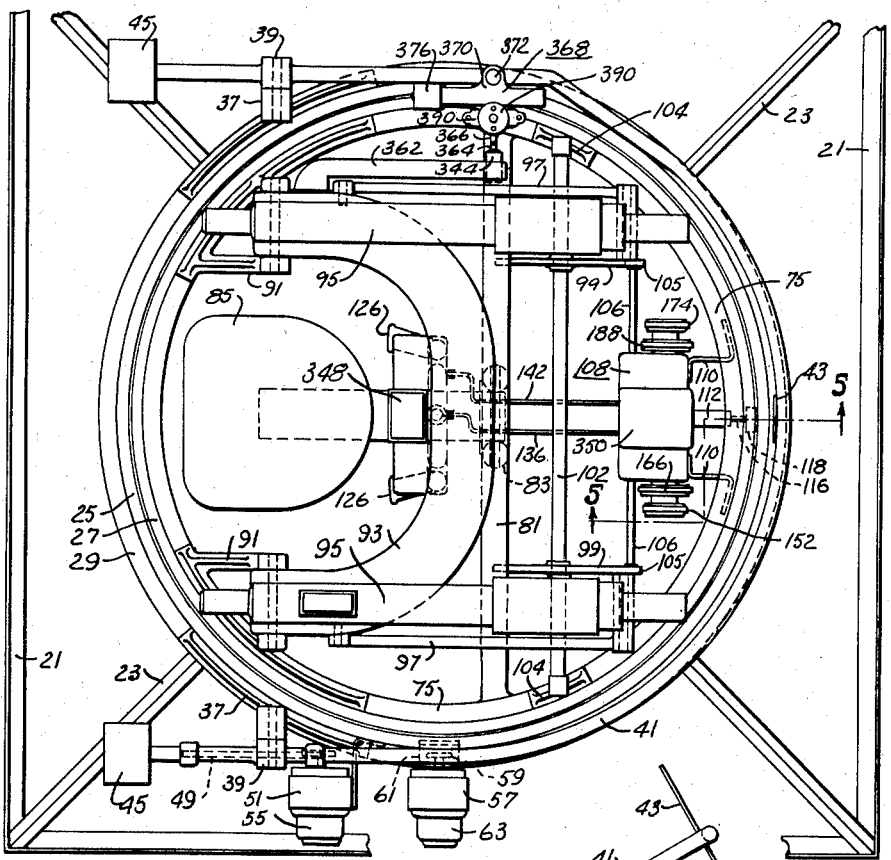
Figure 2 is a top view of the turret shown in Figure 1.
Figure 3:
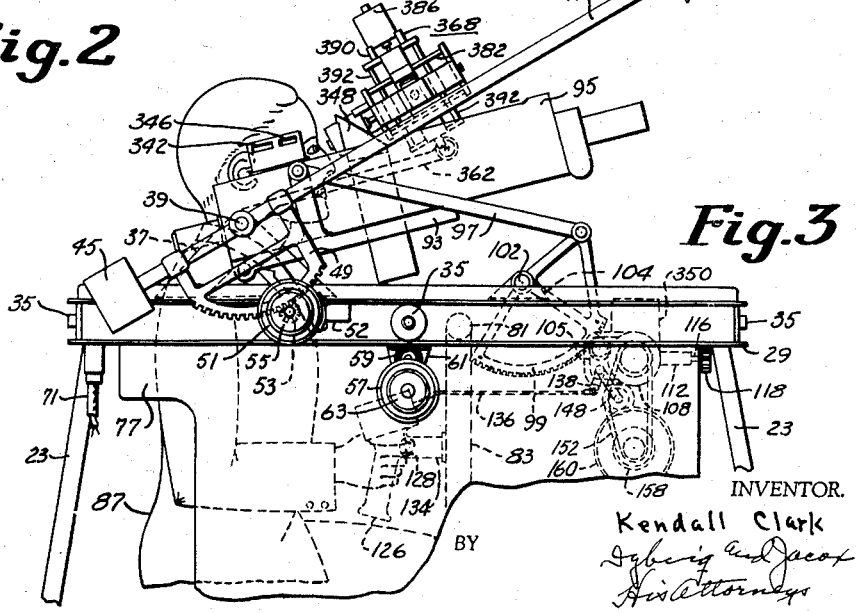
Figure 3 is a fragmentary view of the turret with the target elevated to a 30° angle and the sight elevated to a 15° angle.
Figure 4:
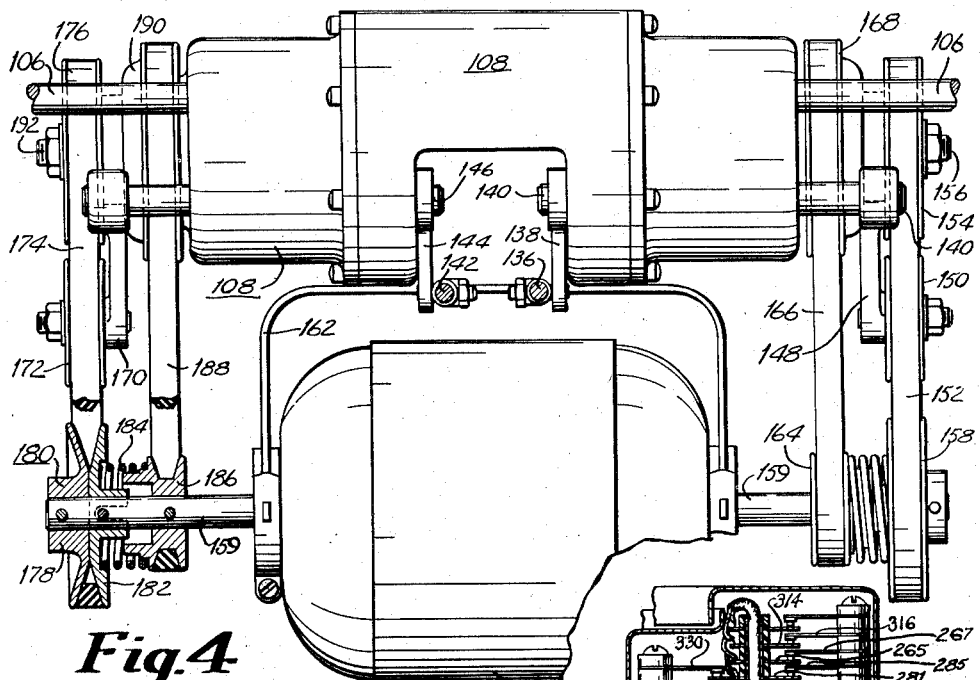
Figure 4 is a view in elevation of the gun moving drive unit which is applicable both to the training turret and to an actual combat turret.
Figures 5, 6, 7, 8:
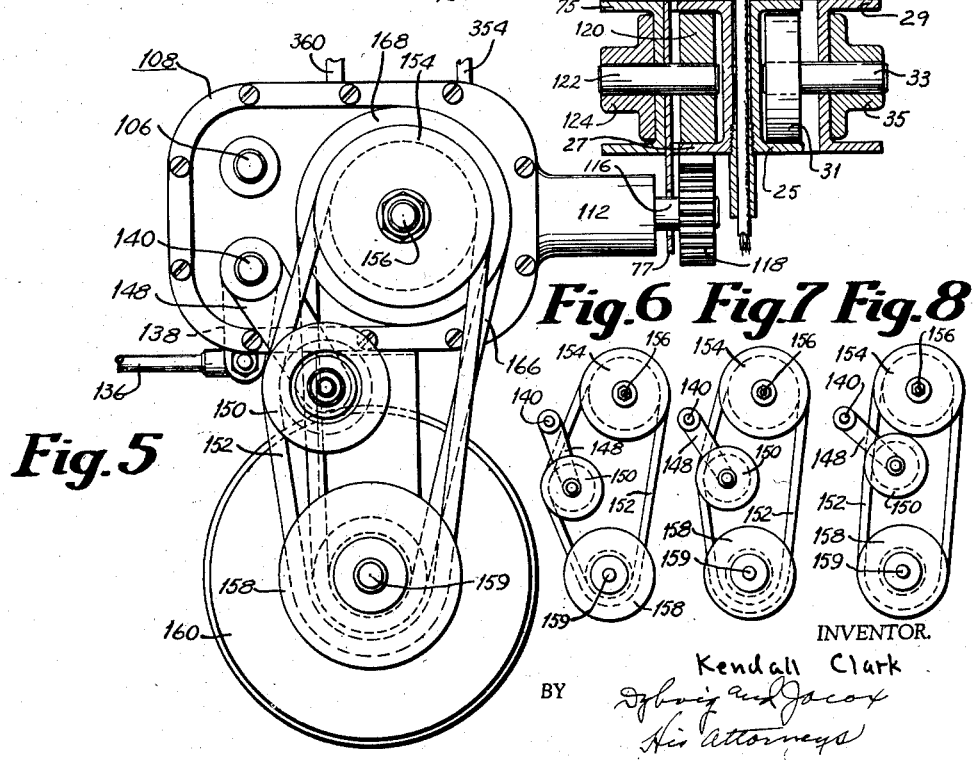
Figure 5 is a side view of the drive unit shown in Figure 4 together with a portion of the turret track, taken on the line 5—5 of Figure 2.
Figure 6 is a small view of the speed adjusting pulley drive shown in Figures 4 and 5 illustrating the position of the drive for movement of the gun in one direction.
Figure 7 is a small view of the pulley drive positioned for holding the gun stationary.
Figure 8 is a small view of the pulley drive positioned for movement of the gun in the opposite direction.

Referring now to the drawings and more particularly to Figures 1 to 3 there is shown a square angle iron base 21 from the corners of which four or more struts 23 extend upwardly to support two stationary rings 25 and 27 of channel iron, the webs of which are placed back to back with a space in between as shown in Figures 2 and 5. The channel iron rings 25 and 27, which may be made integral in the form of an I section, form a rigid stationary support in the form of two circular tracks or rings. The outer stationary track 25 is for the support of the target-carrying mechanism to be hereinafter described, and the inner stationary ring 27 is for the support of the turret or gun-carrying mechanism.

Target mechanism

Upon the outside of the stationary outer ring 25 there is rotatably mounted a movable ring 29 formed of channel iron which is supported in the channel of the stationary ring 25 by the rollers 31 which are rotatably mounted upon the stub shafts 33 held by the flanged supports 35 which are fastened to the web of the channel or movable ring 29.

The movable ring 29 is provided with a pair of brackets 37 (Figures 1 to 3) each provided with a bearing for supporting a pivot pin 39 providing a pivotal connection with the U-shaped target support loop 41 which overlaps substantially one-half the circumference of the ring 29. The target 43 which may have the outline of an aeroplane is provided at the middle point of the support loop 41. The support loop 41 is provided with a pair of counter weights 45 to correct its unbalance. The target support loop 41 is provided with a sector gear 49 driven by an electric motor 51 through a pinion gear 53. The motor 51, which is supported by the bracket 52 fastened to the movable ring 29, has directly connected to it a small generator 55 the purpose of which will be explained hereafter. The motor 51 drives a pinion 53 in engagement with the sector gear 49 to elevate or lower the target 43. In order to move the target horizontally, a second motor 57 is provided with a gear reduction extending to a rubber tired roller 59 in driving engagement with the lower face of the movable ring 29. This motor 57 is supported by the bracket 61 fastened to the stationary ring 25. The motor 57 is likewise coupled to a small generator 63 for a purpose to be explained hereafter.

The motors 51 and 57 are controlled manually by the remote target control 65 (Figure 1) provided with a single vertical and lateral control 67 in the form of a control stick which projects upwardly from the control box 69 which is provided with a universal type support (not shown) at the lower end of the stick. The target control 65 is connected by suitable flexible conductors in the flexible casing 71 with the motors 51 and 57 and by two flexible conductors in the flexible casing 73 with a suitable source of power. The operation of the control 65 will be explained hereafter in connection with Figure 16.

The turret housing

Within the stationary inner ring 27 is a movable ring 75 of channel iron (Figures 2 and 5) which forms the main frame of the turret. This movable ring 75 is rotatably supported within the stationary ring 27 by the rollers 120 which are rotatably mounted upon the stub shafts 122 supported by the flanged hubs 124 mounted upon the movable ring 75. Depending from the movable ring 75 is a cylindrical shell 77 which encloses the gunner's portion of the turret and supports the floor 79. The movable ring 75 is provided with a transverse member 81 which locates the vertical support members 83. These support members 83 in turn carry a seat 85 for the gunner 87 indicated in Figure 1. A support 89 is also provided for the gunner's feet. The cylindrical shell is open at the rear to permit entrance and exit of the gunner.

The gun mount

The movable ring 75 is provided with a pair of brackets 91 which pivotally support a gun yoke 93. Supported upon this gun yoke are a pair of simulated guns 95 which may be of any suitable type when the turret is used for training purposes. When the turret is used for actual combat or firing purposes, the pair of simulated guns are replaced by actual machine guns of any suitable type, an example of which is shown in Figure 11. In order to elevate the gun yoke 93 and the guns 95 there are pivotally connected to the opposite sides of the yoke 93 the links 97 which connect to a pair of sector gears 99 fastened to a cross rod 102 rotatably supported by the brackets 104 upon the movable ring 75. The sector gears 99 mesh with pinions 105 upon opposite ends of the shaft 106 (Figure 2) which extends in opposite directions from the turret drive unit 108. The turret drive unit 108 is supported by the brackets 110 carried by the movable ring 75. In order to rotate the turret, the turret drive unit 108 is provided with a hub 112, having a bearing 114 (Figure 9) in its outer end. Protruding from this hub is a shaft 116 which carries a pinion 118 which is in driving engagement with ring gear 119 upon the bottom face of the stationary ring 27, as best shown in Figure 5. The rotation of this pinion 118 turns the ring and the entire turret relative to the stationary ring 27. Instead of the pinion 118, a rubber tired roller may be used in direct engagement with the bottom face of the stationary ring 27. The ring gear 119 is then omitted.

Gun control

Referring to Figures 1, 2, 3 and 15, the gun and turret control is provided with a pair of handles 126 to be clasped by the gunner for moving the gun both vertically and horizontally. One of the handles is provided with trigger 128 for controlling the firing of the guns or any simulations thereof. As is best shown in Figure 15, the handles 126 are connected together by a hollow box-shaped handle bar 130 which may contain computing instruments for the sight 348, if desired. This handle bar 130 is supported by a universal joint connection 132 upon a bracket 134 extending from the vertical supports 83. The handle bar 130 is connected in its middle rear by elevation control rod 136 to the lever 138 upon the end of the shaft 140 of the turret drive unit 108 as shown in Figures 2, 3, 4, and 5. This controls the gun elevating drive provided by the turret drive unit 108 through the shaft 106 and the pinions 105 which mesh with the sector gears 99 carrying the links 97 which connect with the gun yoke 93. At one side, the handle bar 130 is connected by the azimuth control rod 142 with the lever 144 provided on the inner end of a shaft 146 (Figures 4 and 9) in the control portion of the turret drive unit 108. The shaft 146 controls the rotation of the pinion 118 to rotate the turret.

The mechanism of the turret drive unit

Referring now more particularly to Figures 4 to 10 inclusive, it will be seen that the shaft 140 is located in axial alignment with the shaft 146 directly beneath and parallel to the shaft 106 as shown in Figure 5. This shaft 140 protrudes from the outer end of the drive unit 108 and is provided with an arm 148 carrying an idler pulley 150 which is in contact with a V-belt 152. This V-belt 152 extends around a fixed pitch pulley 154 fixed to the shaft 156 protruding from the one end of the drive unit 108 and a spring pressed variable pitch pulley 158 fixed to one end of the drive shaft 159 of the double ended electric motor 160 supported by the bracket 162 of the turret drive unit 108. This end of the motor shaft 159 also is provided with the fixed pitch pulley 164 for driving by means of the V-belt 166 a fixed pitch V-belt pulley 168 of twice the pitch diameter of the pulley 164. This side of the turret drive unit is employed to control the elevation or zenith movement of the gun.

Upon the opposite side of the turret drive unit 108, which controls the horizontal or azimuth movement of the gun, the shaft 146 is provided at its outer end with an arm 170 carrying an idler pulley 172 which is maintained in contact with the V-belt 174 extending around the fixed pitch pulley 176 and the variable pitch pulley 178 fixed to the end of the drive shaft 159 of the double ended electric motor 160. This pulley 178 is provided with one flange 180 which is fixed to the end of the motor shaft and a second flange 182 which is slidably but non-rotatably mounted upon the motor shaft. This second flange 182 is resiliently urged toward the fixed flange 180 by the compression spring 184 located between the flange 182 and a smaller pulley 186 which is fastened to the motor shaft 159. The pulleys 158 and 178 are identical with the exception that the shaft ends and pulleys are reversed in position. The fixed pitch pulley 186 through the V-belt 188 drives a fixed pitch pulley 190 of twice its pitch diameter.

The pitch diameter of the variable pitch pulleys 158 and 178 through the action of the idler pulleys 150 and 172 are varied for example from a ratio in which the pitch diameter is three fourths the pitch diameter of the fixed pitch pulleys 154 and 176, as illustrated in Figure 6, to a ratio wherein the pitch diameter of the pulleys 158 and 178 is one and one fourth times the pitch diameter of the fixed pitch pulleys 154 and 176, as illustrated in Figure 8. This range of ratio may be increased or diminished as required in order to provide a greater or lesser range of speed variation.

The pulley 176 is fixed to the shaft 192 to which is keyed a bevel gear 194 meshing with a set of differential gears 196 which are freely rotatably mounted upon the differential hub 198. The differential hub 198 extends in the form of a sleeve concentrically mounted upon and rotatable independently of the shaft 192 with the pulley 190 fixed upon its outer end. The foregoing elements together with the bevel gear 209 constitute the first azimuth planetary system. The pulley 154 is similarly connected through the shaft 156 to a beveled gear 203 which meshes with the freely rotatable differential gears 205 carried by the differential hub 207 which, similarly is rotatably mounted on shaft 156 and carries a pulley 168, upon its outer end. The foregoing elements together with the bevel gear 221 constitute the first zenith planetary system.

The differential gears 196 mesh with a second beveled gear 209 having a spur gear 201 mounted directly thereon which forms the sun gear of a second azimuth planetary system which includes the planet gears 211 enmeshed with the sun gear 201 and ring gear 213. The planet gears 211 are rotatably mounted upon a carriage 215 provided with a sleeve extending to carry the bevel gear 217 which meshes with a bevel gear 219 provided at the inner end of the azimuth shaft 116 which through the pinion on roller 118 rotates the turret. The second beveled gear 209, the spur gear 201 and the sleeve of the carriage 215 are all rotatably mounted on the shaft 192. On the other side of the unit used for elevating the guns, the differential gears 205 mesh with the bevel gear 221 which has coupled directly to it the second zenith planetary system which includes a sun gear 223 meshed with the planet gears 225 which in turn mesh with an internally toothed ring gear 227. The planet gears are carried by a carriage 229 which in turn carries a helical gear 231 connected through an idler gear 233 with a helical gear 235 fixed to the shaft 106 which extends in opposite directions and is provided with the zenith or gun elevating gears 105 at its opposite ends of the turret drive unit 108, as best shown in Figure 2. The bevel gear 221, the sun gear 223 and the sleeve of the carriage 229 are all rotatably mounted on the shaft 156.

With this construction, the turret rotating or azimuth drive section contains two planetary or epicyclic gear trains and likewise the gun elevating or zenith drive section contains two planetary or epicyclic gear trains. The first epicyclic gear train of each section is that which includes the differential gears 196 for azimuth drive and the differential gears 205 for the zenith drive. It will be understood that by this differential drive arrangement if the pulleys 168 and 154 turn at the same angular speed the differential is, in effect, locked and the bevel gear 221 turns at the same speed as the pulleys 168 and 154. But if the pulley 154 turns at twice the angular speed of the pulley 168 as in Figure 7 then the bevel gear 221 will remain stationary and there is no movement of the zenith driving gear 105. This is true because the differential gears 205 rotate in the opposite direction with respect to the gear 203 and therefore neutralize under these conditions the rotation of the gear 203.

When as in Figure 6 the pulley 154 rotates at a speed between one and two times the speed of the pulley 168 the bevel gear 221 will be given a rotational movement in the same direction as the pulleys but at a reduced speed which approaches zero as the pulleys approach a two to one angular speed ratio. When as in Figure 8 the pulley 154 rotates more than twice as fast as the pulley 168 the bevel gear 221 will turn in the opposite direction at a speed which will increase as the ratio increases above two to one. This type of drive is especially valuable for moving a gun both in azimuth and in zenith since it is possible to keep the drive motor and gearing rotating continuously so that it is instantly available for moving the gun. It has the further advantage that the motor and connected gearing have sufficient rotational inertia so as to make the drive mechanism immediately responsive to the gunner's control.

The second planetary or epicyclic gear train of the azimuth as well as the zenith sections has two functions. One function is to provide speed reduction and the other function is to reduce hunting in training the gun sight upon the target.

When an operator endeavors to train a sight upon a moving target such as an aeroplane he must first speed up the gun moving mechanism at a more rapid rate than the moving target in order to catch up with the moving target. As the moving target comes within the field of sight it is necessary to slow down the gun moving mechanism until it is equal to the speed of the moving target. This almost inevitably causes the overrunning of the target in the sight several times. In order to reduce this difficulty I provide means whereby, when the control for the driving mechanism is moved to start movement of the gun, an additional accelerating force is superimposed upon the turret drive unit. This provides an especially rapid start for the movement of the gun which quickly slows down so that it follows the normal gun movement requirements of rapidly catching up with the target. This effect also provides a quick negative acceleration or deceleration for slowing down to the speed of the target when the target comes within the field of sight. This aids in reducing the amount and frequency of overrunning the target. This positive and negative acceleration effect is referred to as "kick" in the claims.

The mechanism for accomplishing this purpose is illustrated in Figures 9 and 10. This is accomplished by fixing a forked arm 241 to the azimuth control shaft 146 and a similar forked arm 243 to the zenith control shaft 140. The forked arm 241 is provided with a slot 245 which engages a pin 247 protruding from the ring gear 213. The ring gear 213 is thus held stationary as long as the azimuth control shaft 146 is held stationary. In the second azimuth planetary system the three gear elements 211 and 201 and 213 mutually react upon one another but when the ring gear 213 is held stationary it takes the reaction, and the planet gears 211 then rotate in direct proportion to the rotation of the sun gear 201. The ring gear 213 is therefore sometimes referred to as a normally stationary reactor element. As is shown best in Figure 10 the forked arm 241 has a movement of nearly 90° and is capable of moving the ring gear 213 about 30° in either direction from the mid point of the arm 241. This initial movement of the normally stationary ring gear 213 provides an added rotation of the planet gear 211 and the bevel gears 217 and 219 and the turret drive gear 118 which provides the initial burst of speed which is very desirable in moving the gun when it is being trained upon the target. Thus the movement of the ring gear 213 provides a movement of the planet gears 211 even though the sun gear 201 be stationary. If the sun gear 201 should be rotating at one speed to normally drive the planet gears 211 at a second speed in direct proportion thereto, the movement of the ring gear 213 will either increase or decrease the speed of the planet gears 211 from that second speed, depending upon whether the ring gear 213 is rotated in the same or opposite direction as the rotation of the sun gear 201. For example, the ring gear 213 is rotated in the same direction as the sun gear 201 when it is desired to speed up the movement of the turret or the gun in any given direction while the ring gear 213 is rotated in the direction opposite to the rotation of the sun gear when the movement is slowed down.

By this arrangement whenever the handle bar control is moved initially to start the operation of the azimuth drive section, the ring gear 213 is moved in the direction of the desired movement an amount depending upon and roughly proportioned to the speed that the operator desired from the azimuth drive section. The corresponding mechanism for the zenith drive section is not shown but the forked arm and the cooperating pin on the ring gear 227 are identical in construction and operate in the same manner as described for the arm 241 and the pin 247 and the ring gear 213.

*Wiring diagram—target moving portion*

Figure 16:
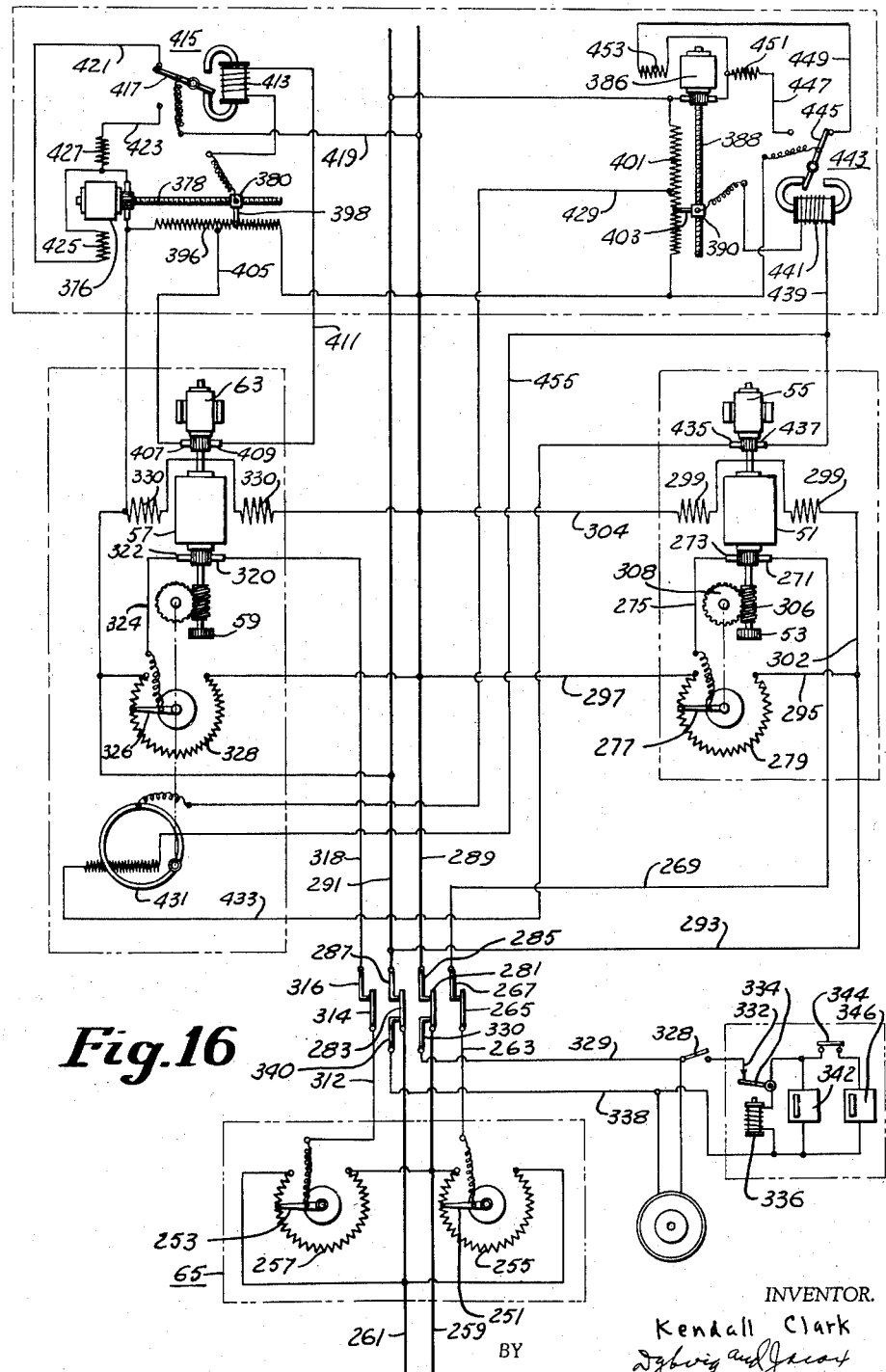
Figure 16 is a wiring diagram of the target control system, the target compensating system and the scoring system.

Referring now to Figure 16, there is shown the movable contact arm 251 which is controlled by the fore and aft movement of the control 67 (Figure 1) to lower or raise the target in its zenith movement, while the movable contact arm 253 is controlled by the lateral or left and right movement of the control 67 to control the azimuth movement of the target to left and right respectively. The arm 251 taps a potentiometer coil 255 while the arm 253 taps the potentiometer coil 257. These coils 255 and 257 are connected in parallel electric circuits across the direct current supply conductors 259 and 261 provided in the casing 73 (see Figure 1). The contact arm 251 is connected by the conductor 263 to the stationary conductor ring 265 mounted on fixed ring 25 (see Figure 5)

which is always contacted by the contact 267 supported by the movable target carrying ring 29. This contact 267 is connected by the conductor 269 to the commutator brush 271 of a direct current motor 51 which moves the target 43 in a vertical direction. The other commutator brush 273 is connected by the conductor 275 to the movable contact 277 of the potentiometer coil 279. This potentiometer coil 279 is connected across the supply conductors.

The supply conductors 261 and 259 are connected to the stationary conductor rings 281 and 283 upon which ride the wiping contacts 285 and 287 provided upon the movable target carrying ring 29. These contacts 285 and 287 connect to the transmitting conductors 289 and 291 which connect to the electrical devices on the turret. The potentiometer coil 279 is connected at one end through the conductors 293 and 295 to the transmission conductor 291 and at the other end through the conductor 297 to the transmission conductor 289. The field coils 299 of the electric motor 51 are likewise connected by the conductors 302 and 304 across the transmission conductors 289 and 291.

The motor 51 is provided with a shaft extension containing a worm 306 in operating engagement with the worm gear 308 which drives the movable contact arm 277 in such a direction that when current flows through the commutator of the electric motor 51, the movable contact arm 277 will be moved until it reaches a position where the current through the commutator will be zero. In effect, the potentiometer coil 255 forms the two resistances forming one branch of a Wheatstone bridge circuit while the potentiometer coil 279 forms the two resistances of the other branch of the Wheatstone bridge circuit. The proportioning of the two resistances is provided by the movable contact arms 251 and 277 which are connected through the brushes 271 and 273 of the electric motor 51 to form the bridge of the Wheatstone bridge circuit in which the motor 51 takes the place of the conventional galvanometer.

By this arrangement, when the control 67 moves the movable arm 251 to any desired position, the motor 51 will rotate to elevate the target 43 (Figures 2 and 3) through the gear 53 and the sector gear 49 until the movable contact arm 277 moves to a point where the current through this circuit becomes zero.

The azimuth target control is similar to the zenith target control. The movable contact arm 253 is connected by the conductor 312 to the stationary conductor ring 314 which is contacted by the wiping contact 316 connected by the conductor 318 to the brush 320 of the azimuth drive motor 57 which has its other brush 322 connected by the conductor 324 to the movable contact arm 326. The movable contact arm 326 makes contact with the potentiometer coil 327. The potentiometer coil 327 as well as the field coil 330 of the motor 57 are connected in parallel electric circuit relationship across the transmission conductors 289 and 291. As in the zenith target control, the movement of the movable contact 253 causes the motor 57 to move the movable contact arm 326 and the target supporting loop 41 to a position wherein the current through this circuit becomes a zero. In this way the target is moved in azimuth and zenith, that is, horizontally and vertically in accordance with the movement of the control 67 which controls the position of the contact arms 251 and 253.

Shot and hit computation system

In order to count the number of shots, the gunner presses the trigger 128 which closes switch 328. The switch 328 is connected through the conductor 329 and the wiping contact 330 to the contact ring 281 which connects to the supply conductor 259. The switch 328 connects to the stationary contact 332 of a pulsator or interruptor which includes an electromagnet coil 336 and an armature 334 adapted to make contact with the contact 332 when retracted from the coil 336. The coil 336 is connected electrically to the armature and to the conductor 338 which connects through the wiping contact 340 with the stationary ring 283 which connects to the supply conductor 261.

By this arrangement when the switch 328 is closed the pulsator repeatedly opens and closes the circuit. This is done by reason of the fact that when the armature 334 is in engagement with the contact 332, current will flow through the electromagnet coil 336 and attract the armature 334 to open the circuit. The opening of the circuit will deenergize the coil 336 thereby allowing gravity or a spring to return the armature 334 in contact with the contact 332. This is so adjusted that a number of circuit interruptions substantially equal the firing rate of the type of gun to be used with this style of target.

The interruptions corresponding to the shots which would be fired are counted upon a meter 342 which is connected in electric parallel circuit relationship with the electromagnet coil 336.

The hit computation system

A simple addition to this circuit computes the number of hits the gunner makes upon the target 43. This is provided by a switch 344 which is connected in the circuit which is arranged in parallel with the meter 342 and the electromagnet 336. This switch is so operated that it is closed whenever the gunner properly trains the sight upon the target 43 as will hereinafter be explained. This switch 344 controls the flow of current through this circuit which includes a second meter 346 which counts the impulses of current which flow through this parallel circuit when the switch 344 is closed. With this arrangement the number of shots can readily be determined by inspection of the meter 342 and the number of hits by inspection of the meter 346. From this, the percentage of hits relative to the number of shots can readily be determined. This provides the most important element in determining the skill of the gunner undergoing training.

The operating means for the switch 344 is more complicated. The gunner 87 is provided with a compensating gun sight 348 which may be a standard air craft gun sight or one for example such as is shown in the Patents et al. Patent 1,937,517. Such a sight will advance the gun 95 a proper amount ahead of the target viewed through the sight in order to compensate for the speed of the target as well as the trajectory of the bullets and shells. This is provided for by the computer box 350 which is mounted upon top of a turret drive unit 108 and is driven from the zenith drive through the helical gear 352 on the shaft 354 and from the azimuth drive by the helical gears 356 and 358 and the shaft 360. This computer box controls the sight 348 to provide the proper lead for the gun in advance of the sight upon the target.

The necessity of providing a lead for the gun in advance of the sight for a training turret of this type may be questioned. However, this is desirable in order to keep the gunnery trainee familiar in training in directing compensated sights upon a target and experiencing the lead that such a sight provides for the guns. Inasmuch as a lead is provided for the gun and the entire turret in advance of the sight it is also necessary to compensate the counting mechanism to correct for the speed of the target. The switch mechanism 344 therefore must have compensation for the speed of the target.

The switch 344 proper is carried in a case at the end of an arm 362 (see Figure 2) extending from the gun yoke 93. Thus this arm moves in accordance with the movement of the gun 95. The switch 344 has an operating cam 364 projecting from it. When depressed this cam closes the switch 344. In order to close the switch 344, I provide a cam 366 which is mounted upon compensating mechanism generally indicated by the reference character 368 and shown in detail in Figures 12, 13, 14 and 16. This compensating mechanism includes a bracket 370 which is fastened to the target loop 41 provided with a post 372 for this purpose. The bracket 370 carries a horizontal or azimuth compensating mechanism which includes an electric motor 376 directly connected to a screw 378 which is in threaded engagement with a slide 380. This slide 380 is slidably mounted upon the rods 382 which have their end supports 384 providing the bearing supports for the screw 378. This structure provides the azimuth or horizontal compensation.

The zenith or vertical compensation is provided by the electric motor 386 which rotates the screw 388 which is threaded through the vertical slide 390 carrying the cam 366. The slide 390 is mounted upon the rods 392 which terminate in the end support 394, one of which supports the motor 386. In addition to this mechanism, a potentiometer coil 396 (see Figures 14 and 16) is carried between the bracket 382 and is contacted by the movable contact 398 fixed to the slide 380. Also a potentiometer coil 401 is carried between the bracket 390 and is contacted by the movable contact 403 carried by the slide 390.

As is best shown in the wiring diagram, Figure 16, the ends of the potentiometer coils 396 and 401 are connected across the transmission conductors 289 and 291. The middle point of the coil 396 is connected by a conductor 405 to the commutator brush 407 of the generator 63 which is coupled directly to the drive motor 57. The other commutator brush 409 is connected by conductor 411 with the coil 413 of a polarized relay 415. This polarized relay 415 has an armature or contact member 417 which is connected at all times by conductor 419 to the transmission conductor 289. The construction of this relay 415 is such that when no current flows through the coil 413 then the armature 417 will be at its middle point and not be connected in a circuit. Whenever a current flows through the coil 413 the armature 417 acting as a reversing switch will make contact either with the conductor 421 or the conductor 423 depending upon the direction of current flow. The conductor 421 connects to one set 425 of field windings of the reversible motor 376 and the conductor 423 connects to the other set 427 of the field windings which, when energized, cause the motor 376 to rotate in the opposite direction.

There is a predetermined voltage drop however through the potentiometer coil 396 at all times since it is connected across the transmission conductors 289 and 291. When the horizontal or azimuth drive motor 57 is operated in accordance with the movement of the target control, the generator will generate a current in proportion to the speed of movement of the motor which is moving the target 43 horizontally. This energizes the polarized relay 415 to make contact with either the conductor 421 or 423. This causes the operation of the motor 376 in one direction or the other. The screw 378 is threaded in such a manner that the slide 380 will carry the movable contact 398 under such conditions to the point where the voltage drop between the conductor 405 and the contact 398 is equal to the voltage generated by the generator 63 so that no current will flow through the polarized relay 415. This arrangement will cause the slide 380 to follow the speed of the generator and to compensate for the speed of the target in the horizontal direction.

A similar arrangement is provided for the potentiometer coil 401, movable contact 403 and the zenith compensating motor 386. The middle point of the potentiometer coil 401 is connected by a conductor 429 to a forward-backward control 431 provided with a movable contact ring connected directly to the movable contact 326 which is rotated by the azimuth target motor 57. The coil of this forward-backward control 431 is connected by the conductor 433 to the commutator brush 435 of the generator 55 which is moved by the zenith drive motor 51. The other brush 437 of this generator is connected by the conductor 439 with the electromagnet coil 441 of the polarized relay 443. This polarized relay is also one which disconnects the circuits when deenergized but when energized makes contact with either the conductor 447 or conductor 449. The conductor 447 connects to one set 451 of the field windings while the conductor 449 connects to the other set 453 of the field windings causing the rotation of the motor 386 in opposite direction depending upon the position of the polarized relay 443. The one end of the coil of the forward-backward control 431 is connected by a conductor 455 to the conductor 439. The forward-backward control 431 varies the flow of current provided by the generator 55 in accordance with the direction of the turret with respect to the line of flight of the airplane upon which it is mounted.

The operation of the vertical drive motor 51 causes the generator 55 to generate a current in opposition to the vertical speed of the target 43. This current is compensated for direction by the backward-forward compensator 431 controlled by the rotational position of the turret. The current is used to operate the polarized relay 443 which in turn controls the operation of motor 386 in either direction. The vertical screw 388 is so threaded that when the motor 386 turns it will continue to turn and move the contact 403 in such a direction that the voltage drop between the conductor 429 and the movable contact 403 equals the voltage generated by the zenith target generator 55 as compensated for by the compensator 431. The zenith target generator 55 and the azimuth target generator 63 have such a generating rate that the above described circuit and mechanism will move the cam 366 to the proper position both vertically and horizontally to compensate for the vertical and horizontal speed of the target so that when the sight 348 is properly trained upon the target 43, the cam 366 will engage the cam 364 of the switch mechanism 344 to close the switch 344. If the trigger 128 should happen to be depressed to close the switch 328 then both mechanisms 342 and 346 would count each impulse in the circuit controlled by the pulsator 336. If the trigger 128 is not depressed, the pulsator 336 will not operate to provide impulses. If the cam switch 344 is not closed only the "shot" meter 342 will be operated.

While I have described the disclosure as applied principally to a gunnery trainer it is obvious that many features can be applied directly to a gun turret or gun moving mechanism including particularly the drive mechanism and the compensating drive therefrom.

While the form of embodiment of the invention as herein disclosed constitutes a preferred form, it is to be understood that other forms might be adopted, as may come within the scope of the claims which follow.

What is claimed is as follows:

1. A gunnery trainer comprising in combination, a simulated gun mounted upon a gun yoke, a gun control including trigger simulating means, gun drive means responsive to said gun control for positioning said gun and yoke, a target arm carrying a target, a remote target control, target drive means responsive to said target control for positioning said target arm, a sight carried by said gun yoke for viewing said target, the construction and arrangement being such that said sight may be trained upon said target and caused to follow the movement of said target by operation of said gun drive means, sight compensating means responsive to said gun drive means for adjusting the position of said sight on said gun yoke relative to said gun to provide a lead angle for said gun, electric circuit means responsive to said trigger simulating means for simulating the firing of shots, first counting means for counting in proportion to the number of shots fired, a switch carried by said gun yoke, a cam carried by said target arm for actuating said switch, cam compensating means responsive to said target drive means for adjusting the position of said cam on said target arm such that said cam will engage said switch when said gun has the proper lead angle relative to said target, and second counting means for counting in proportion to the number of shots fired while said switch is actuated by said cam.

2. In a gunnery trainer, the combination with a simulated gun, a gun control including trigger simulating means, gun drive means responsive to said gun control for positioning said gun, a sight, and compensating means responsive to said gun drive means for positioning said sight relative to said gun in accordance with the movement of said gun drive means to provide a lead angle between said gun and said sight, of a target, a target control, target drive means responsive to said target control, electric circuit means subject to the control of said trigger simulating means for simulating the firing of shots, a first counter energized by said circuit means for counting in proportion to the number of shots fired, a switch supported in fixed relationship to said gun, a cam for actuating said switch, compensating means responsive to said target drive means for supporting said cam in compensating relationship to said target such that said cam will actuate said switch when said gun is at the proper lead angle relative to said target, and a second counter subject to the control of said switch and said trigger simulating means for counting in proportion to the number of shots fired while said cam actuates said switch.

3. A gunnery trainer comprising in combination, means simulating a gun, a gun control, a gun drive responsive to said gun control for positioning said simulated gun, a target arm carrying a target, a target control, a target drive responsive to said target control for positioning said target, an electric circuit for simulating the firing of shots, trigger simulating means for actuating said circuit to effect the firing of shots, a counter for counting shots fired, switch means operating between said target arm and said gun simulating means for connecting said counter in said electric circuit when said simulated gun is at the correct lead angle relative to said target, means responsive to said target drive for adjusting said switch means so as to vary the lead angle at which said switch means will operate in accordance with the motion of said target, a sight, and means responsive to said gun drive for positioning said sight relative to said simulated gun such that when said sight is trained on said target said gun will have a lead angle relative to said sight determined by the movement of said gun drive, the construction and arrangement being such that when said gun control is manipulated so as to cause the sight to follow the movements of said target said switch means will operate to cause the simulated shots then fired to be counted.

References Cited in the file of this patent

UNITED STATES PATENTS

| | | |
|---|---|---|
| 2,183,530 | Alkan | Dec. 19, 1939 |
| 2,269,410 | New | Jan. 6, 1942 |
| 2,373,313 | Jeandron | Apr. 10, 1945 |
| 2,418,512 | Johnson | Apr. 8, 1947 |
| 2,442,240 | Hooker et al. | May 25, 1948 |
| 2,458,448 | Tuttle | Jan. 4, 1949 |